United States Patent [19]

Rauckhorst et al.

[11] 4,314,616
[45] Feb. 9, 1982

[54] DIE-CAST MASONRY DRILL WITH LEADING HARD INSERT

[75] Inventors: James E. Rauckhorst, Geneva; Thomas J. Skingle, Parma, both of Ohio

[73] Assignee: Acme-Cleveland Corporation, Highland Heights, Ohio

[21] Appl. No.: 116,225

[22] Filed: Jan. 28, 1980

[51] Int. Cl.³ .............................................. E21B 10/58
[52] U.S. Cl. .................................... 175/394; 175/410; 76/108 A
[58] Field of Search ............... 175/394, 395, 410, 329, 175/374; 76/108 R, 108 A

[56] References Cited

U.S. PATENT DOCUMENTS

| 1,186,094 | 6/1916 | Heinkel | 76/108 A |
| 1,657,063 | 1/1928 | Brown | 164/105 |
| 1,866,602 | 7/1932 | Ridgeway et al. | 175/410 |
| 2,614,813 | 10/1952 | Shepherd | 175/410 |
| 2,635,856 | 4/1953 | Scheffer | 175/394 |
| 3,447,616 | 6/1969 | Granat | 175/394 |

FOREIGN PATENT DOCUMENTS

| 2545452 | 4/1977 | Fed. Rep. of Germany . | |
| 707021 | 4/1954 | United Kingdom | 175/410 |
| 1516775 | 7/1978 | United Kingdom . | |

*Primary Examiner*—Ernest R. Purser
*Attorney, Agent, or Firm*—Pearne, Gordon, Sessions, McCoy & Granger

[57] ABSTRACT

A masonry drill and method for its manufacture are disclosed. The drill has an axially elongated body which is made from a die cast material and has one or more spiral grooves cast in its exterior surface substantially along its length. A hard insert is embedded in the leading end of the body. The insert is formed with sides having generally planar side portions, a top chisel edge, and a bottom edge. The insert preferably has means for interlocking with the body, the interlocking means preferably comprising a projection extending from the plane of each of the side portions. Each projection extends the greatest distance from the plane of the side portions near the bottom edge of the insert. The insert is held in place by casting the body around it so that the body substantially surrounds the projection, and especially entirely covers the portion of the projection nearest the chisel edge. As the die cast material of the body cools following the casting operation, it contracts around the insert to securely hold the insert in place. An extremely economical yet rugged drill is thus formed.

8 Claims, 15 Drawing Figures

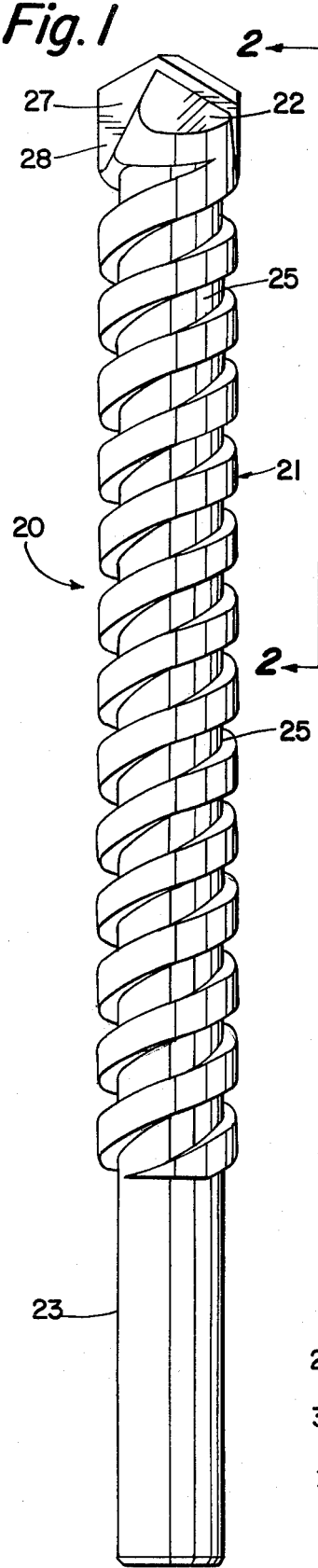
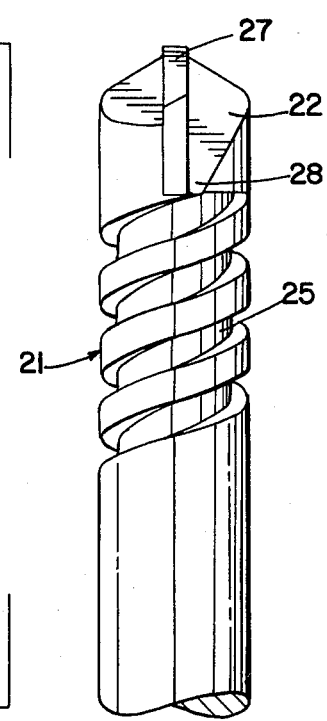
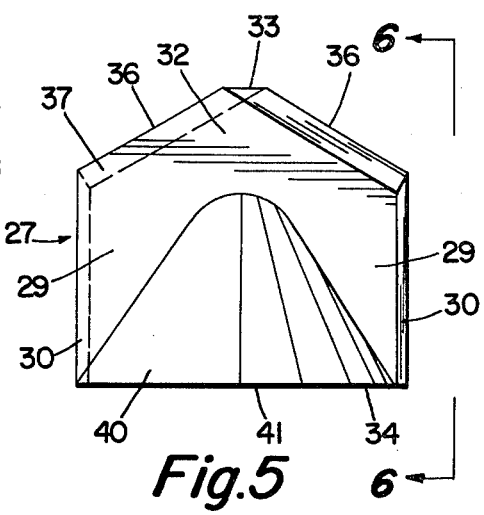
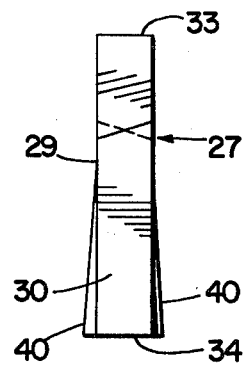
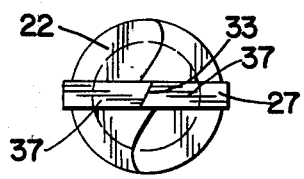
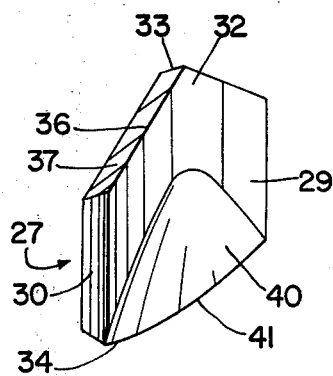
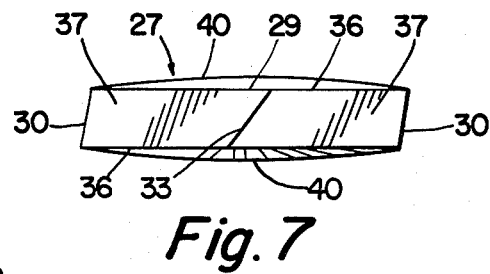
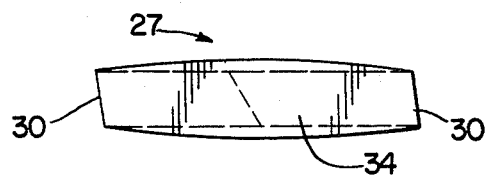

DIE-CAST MASONRY DRILL WITH LEADING HARD INSERT

BACKGROUND OF THE INVENTION

1. Field of the Invention

This invention relates to the construction of drills, and particularly to drills which are specially adapted for drilling masonry, stone, rock, concrete, cement, cinder block, and the like.

2. Description of the Prior Art

Masonry drills have been known and are commonly used for drilling holes in especially hard friable material such as masonry or stone. These drills are usually comprised of an elongated body or shank having a spiral groove or grooves formed along their length and having a diametrically extending straight groove on their leading end. A hard insert was provided in the straight groove and was held in place by soldering or brazing. The insert usually had sharp cutting edges on its leading end so that the drill might effectively be used in the hard masonry or stone material. The spiral groove provided a channel for the discharge of chips, particles, dust and other drilling debris loosened by the leading end of the drill during the drilling operation. The insert must be capable of resisting wear, fracture, and the abrasive action of the chips from the material being drilled, while the body of the drill must maintain sufficient strength in the presence of heat generated in use.

In the manufacture of prior art masonry drills, it has been the practice to make the drill body of a material such as steel and to mount the abrasion-resistant insert or cutting elements at the cutting end. The body of the drill was normally formed by conventional rolling, machining or grinding the spiral thread in a blank or rod of suitable length. The straight groove for the mounting of the insert or cutting element was then machined in the leading end of the drill body, and the cutting element was placed and secured. The cutting element was formed of a hard material such as tungsten carbide and was usually anchored in place in the body of the drill by soldering or brazing it in place.

Examples of prior art masonry drills are shown in the following U.S. Pat. Nos.: 2,879,036 issued to Wheeler; 2,902,260 issued to Tilden; 3,372,763 issued to Fischer; 3,447,616 issued to Granat; 3,469,643 issued to Horst; 3,674,101 issued to Chromy; and 3,845,829 issued to Schaumann.

The manufacture of prior art masonry drills by these known processes has been relatively expensive. The initial expense of these masonry drills may be offset somewhat in industrial use by resharpening the hardened insert or cutting element a number of times. While satisfactory but expensive industrial quality masonry drills have been manufactured by this process, it has not been possible to provide inexpensive yet high quality masonry drills for nonindustrial users. The initial expense of a masonry drill provided to consumers through retail outlets such as hardware stores may not be offset by resharpening, since the average nonindustrial user generally does not have the capability of resharpening carbide tips. In addition, the tools purchased by nonindustrial users are often purchased for very limited use, such as to drill several holes needed for a particular job, and the drill may not be used again thereafter since the user may not have occasion to do so.

An additional cost associated with the manufacture of masonry drills of the prior art was the cost of inserting and soldering or brazing the cutting element or insert in place. Since it is important that the insert be firmly anchored in the drill body, there did not appear to be any means for eliminating this step in the manufacturing process.

There is presently a need for an inexpensive tool that will perform substantially equivalent to the conventional masonry drill yet will cost significantly less. The usable life of the body of such a drill need only be as long as that of the carbide tip, since the tip would probably not be resharpened. However, it is possible that such a drill may be resharpened, so that it would be advantageous if the body would outlast the tip.

It may be possible to reduce the cost of manufacturing with conventional methods, but this may require a major expenditure and an assurance of high volume production. Even with conventional methods, moreover, the cost reductions would not be significant.

SUMMARY OF THE INVENTION

The present invention overcomes many of the difficulties and shortcomings of the prior art masonry drills and affords other features and advantages heretofore not obtainable. The present invention provides a masonry drill which includes a hard drilling tip formed of an insert and which may be manufactured more economically than drills of the prior art. In accordance with the present invention, the body of the drill is formed by a die casting process, whereby the spiral groove or grooves in the body of the drill may be formed economically in a single process without expensive machining, rolling, or grinding. In addition, the hard cutting insert is cast in place on the leading end of the drill body, thereby eliminating the additional processes of forming a groove on the leading end of the drill body, placing the cutting insert into the groove, and soldering or brazing the insert in place.

In accordance with another aspect of this invention, the hard cutting insert is provided with interlocking means for securing the insert to the drill body. In the preferred embodiment of the invention, the interlocking means comprises a pair of projections on the insert each of which extends from one side of the insert with the cast drill body substantially surrounding the projections and securely holding the insert in place. The insert is also secured by the metal from the body of the drill as it cools following the casting operation and contracts with respect to the insert as a result of the differences in rates of thermal expansion between the insert and the casting material used in forming the body of the drill.

The particular design of the interlocking means is important to the invention, since the coefficient of thermal expansion of the metal used in the formation of the cast body of the drill is significantly greater than the coefficient of thermal expansion of the material used in the tip, such as tungsten carbide. Therefore, in forming an interlock between the tip and the body, it is possible that the material of the drill body may contract away from a portion of the surface of the insert at certain places as the body cools following the casting operation. If the drill body contracts away from the surface of the insert, it may create gaps which would weaken the drill and the connection formed between the insert and the body.

In accordance with another aspect of this invention, the interlocking means is designed to avoid additional steps in the manufacturing process of the insert. The interlocking means preferably comprises a pair of projections which extend on each side of the insert from the plane of the flat side portions of the insert with each projection tapering inwardly to the plane of one of the flat side portions as the projection extends toward the cutting end of the insert and with the cast material of the body substantially covering the portion of the projection extending toward the cutting end of the insert, so that the drill insert cannot be removed axially from the drill, providing a more secure connection between the insert and the body by utilizing the contraction of the drill body around the insert.

The interlocking means of the present invention is designed to avoid loss of strength in the insert by avoiding any reduction of the thickness of the insert which may result from using cutouts or providing holes in the insert as part of an interlocking means. Such holes or cutouts may result in weakening of the insert and in drill failure. In addition, the insert is also secured in the body of the drill at the leading or cutting end of the drill by utilizing the thermal contraction of the cast material of the body of the drill as means for holding the insert in place, so that the invention does not rely solely upon the mechanical interlock provided by the projection as the means for securing the insert in place.

These and other advantages are accomplished by the die cast masonry drill of the present invention, which comprises an axially elongated, generally cylindrical body having a leading front end portion and rear end portion. The rear end portion is adapted to be held by a tool holder. The body is formed of a die cast material, preferably a zinc alloy, and has a spiral groove or grooves cast in its exterior surface substantially along its length. A hard insert is embedded in the leading end of the body. The insert is generally flat and extends generally diametrically across the leading end of the body. The insert has on each side parallel flat side portions and a chisel edge extending across the top between the sides with leading cutting edges on either side of the chisel edge. The insert also has a bottom edge opposite the cutting edges. The insert has means for interlocking with the body. The interlocking means comprises one or more projections or pairs of projections, one projection on each side extending from the plane of the flat side portion. Each of the projections extends the greatest distance from the plane of the side portion near the bottom edge of the insert. Each projection is substantially surrounded by the body to retain the insert in place. In particular, the portion of each projection nearest the chisel edge is entirely covered with the die cast material of the body to form a secure interlocking relationship between the insert and the body.

In accordance with another aspect of the invention, a method is disclosed for making a masonry drill in which an insert is formed from a hard material. The insert is formed with parallel planar portions on each side and a chisel edge extending across the top of the insert between the sides with leading cutting edges on either side of the chisel edge and a bottom edge on the insert opposite the cutting edges. The insert is also formed with means for interlocking the insert with a drill body. The interlocking means comprises a pair of projections, one projection on each side extending from the plane of the side portion. Each of the projections extends the greatest distance from the plane of the side portion near the bottom edge of the insert. The insert is placed in a mold for casting a drill having an axially elongated body with spiral grooves cast in the exterior surface of the body substantially along its length. The mold is filled with molten metal to form a cast drill in the mold. The molten metal substantially surrounds each of the projections in the insert and covers the portion of each projection nearest the chisel edge to form a secure interlocking relationship between the insert and the body. The cast drill is then allowed to cool with the molten metal contracting around the insert to securely hold the insert in place in the drill.

BRIEF DESCRIPTION OF THE DRAWINGS

FIG. 1 is a side elevational view of the drill of the present invention.

FIG. 2 is a side elevational view of the drill taken along lines 2—2 of FIG. 1.

FIG. 3 is a top plan view of the drill of FIG. 1.

FIG. 4 is a perspective view of a preferred form of insert used in the present invention.

FIG. 5 is a side elevational view of the insert of FIG. 4.

FIG. 6 is a side elevational view of the insert taken along lines 6—6 of FIG. 5.

FIG. 7 is a top plan view of the insert of FIG. 5.

FIG. 8 is a bottom plan view of the insert of FIG. 5.

DETAILED DESCRIPTION OF THE PREFERRED EMBODIMENT

Figure 9:
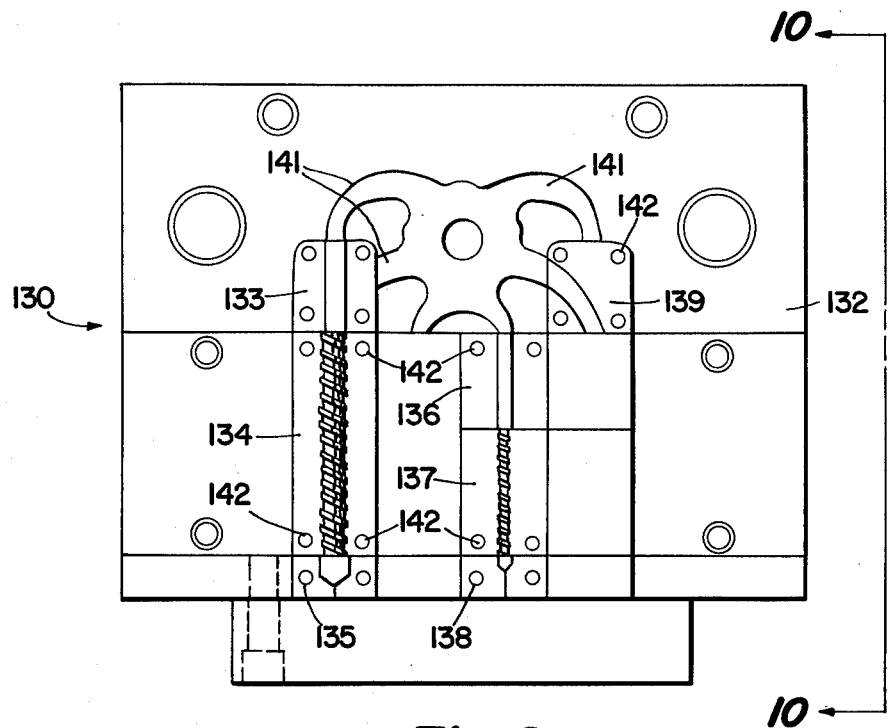
FIG. 9 is a top plan view of a mold used to cast the drill in accordance with the present invention.

Referring more particularly to the drawings, and initially to FIGS. 1-3, there is shown the masonry drill 20 of the present invention. The drill 20 comprises an axially elongated, generally cylindrical body 21 having at its leading or front end a tin 22 which drills into the masonry or other material. The body 21 may be of any suitable length and preferably substantially in excess of the deepest hole to be drilled. The body 21 also has a diameter slightly smaller than that of the hole to be drilled. At the rear end portion there is formed a cylindrical elongated shank 23 which is adapted to be releasably clamped in the chucking device of a suitable driving unit, such as a motor driven drill. The shank 23 may be generally cylindrical with a smooth outer surface.

The body is formed with threads defining a pair of spiral or helical discharge channels or flutes or grooves 25. Although a single groove may be used, a pair of grooves 25 is preferred. The spiral grooves 25 are formed in the drill body 21 along its entire length from the tip 22 to the shank 23. In accordance with known principles of drill design, the grooves 25 provide a means for the discharge of drilling debris during the use of the drill. The spiral grooves 25 are of sufficient width and depth to be capable of conveying chips, particles and dust dislodged by the cutting means at the drill tip 22 and operate in known manner to advance the chips, particles and dust toward the shank 23 as the drill is rotated.

A hard insert 27 is embedded in the body 21 at the tip 22. The insert 27 is arranged to extend diametrically across the end of the drill and provides a hard cutting means for forming a hole in the material to be drilled. The insert 27 is preferably slightly wider than the greatest diameter of the cylindrical drill body 21 so that the insert cuts a hole slightly larger than that needed to accommodate the drill body. As previously discussed, the body of the drill 21 is preferably formed with a pair of grooves 25, one of which ends on each side of the insert 27 to provide an escape path for drilling chips, particles, dust, and other debris loosened by the insert 27 during the drilling operation. As shown in FIGS. 1 and 2, the leading end of each of the grooves 25 terminates adjacent the side of the insert 27 to enable the cuttings from the material being drilled to freely flow through the groove and exit at the rear end portion of the body. Preferably, a short, longitudinally extending channel 28 is formed on each side of the drill body 21 at the tip 22 to provide a path for cuttings from the insert 27 to enter the groove 25. The insert 27 is firmly embedded in the end of the body 21 with leading end portions of the body extending on each side of the insert 27, as explained in detail more fully hereinafter.

The preferred form of insert 27 is shown in more detail in FIGS. 4-8. The insert 27 preferably comprises a hard flat element having a pair of sides which have generally flat parallel portions 29. The two flat side portions 29 extend between two end edges formed by narrow end faces 30, as shown in the drawings. A point 32 projects upwardly from the top portion of the sides as shown in the drawings, and a chisel edge 33 is formed between these points, extending diagonally between the sides. The chisel edge 33 forms the forward or leading end of the drill. A narrow bottom edge face 34 extends along the insert opposite the chisel edge 33 between the end faces 30. A pair of cutting edges 36, each formed by the junction of a clearance face 37 and the plane of the side portion 29, extend outwardly on each side of the chisel edge 33. The clearance faces 37 are inclined in opposite directions so that the leading edge 36 of each of the clearance faces 37 provides a sharp cutting blade to be used in the drilling operation as the drill is rotated.

To help secure the insert 27 in the body 21, the insert is provided with interlocking means. In the preferred form of the tip, the interlocking means comprises a pair of projections 40 which extend from the plane of each of the flat side portions 29. When the insert 27 is embedded in the body 21, the projections 40 are surrounded by the body material. In particular, the upper portions of each projection, i.e., the portions of each projection closest to the chisel edge 33 and to the cutting edges 36, are covered by the drill body 21, making it possible to remove the insert 27 by pulling the insert axially out of the drill body. In addition, the projections 40 are surrounded in all other directions by the drill body 21 so that the insert 27 is firmly secured in the drill body 21.

The projections 40 shown in FIGS. 4-8 are generally symmetrical on each side, extending outwardly the maximum distance from the plane of the side portions 29 at a point 41 at the center of the edge contacting the bottom face 34, with the projection tapering toward the plane of the flat side portions 29 as it extends upwardly toward the chisel edge 33 and outwardly toward the end faces 30.

The insert 27 is formed of a hard material which is resistant to wear and abrasion resulting from its use in drilling into masonry or other similar material. The preferred material for use in forming the insert 27 is tungsten carbide, although other sintered carbides may be used, such as titanium carbide or tantalum carbide, and other hard materials are possible. Tungsten carbide is a particularly suitable material and is preferred because of its relatively hard abrasion-resistant and rugged properties, while being less expensive than other alternative materials which may be used and are capable of withstanding wear and abrasion. Tungsten carbide is also especially adaptable and practical for mass production such as the drill of the present invention.

In the making of the drill in accordance with the method of the present invention, the insert 27 is formed by conventional methods of powdered metallurgy, such as by pressing and sintering. While the insert may be made in various ways, the general method is to mold it from powdered metal sintered or bonded together with a bonding agent in molds sized and contoured to produce the finished insert, whereby a finish grinding operation is not required to complete its manufacture. The inserts are formed with the preformed angled end faces 30 and clearance faces 37, so that any finish grinding is not necessary and steps in the formation of the tip subsequent to the pressing operation are eliminated.

Each projection 40 (FIGS. 4-8) is generally symmetrical, and includes contoured surfaces as are formed by the tapering of the projection from the outwardmost projecting point 41 at the bottom center of the insert into the plane of the flat side portion 29 of the insert, since powder does not readily compact into lateral protrusions during the formation of the tip according to known axial techniques of powder metallurgy compaction. It is not practical to assure the flow of powder into the protrusions and corners, and a relatively large percentage of pieces formed in this manner would be defective as a result. By forming a generally symmetrical projection 40 with contoured surfaces, problems of poor compaction and difficulty in removing pieces from the mold will be avoided, and it is possible to form the insert in a single pressing operation, avoiding subsequent operations such as machining or grinding which would significantly add to the cost of fabrication of the inserts. Therefore, the insert 27 as shown in FIGS. 4-8 is particularly adapted for high production, low cost formation which may be used in the production of the die-cast masonry drill of the present invention.

During the pressing operation, the insert 27 may be formed in a contour pressing mold, and it may thereafter be easily removed with the bottom edge first, since the bottom edge contains the thickest portion of the insert. For this reason, the placement of the point at which the projection extends outwardly the greatest distance from the plane of the flat side portions of the insert should be adjacent to the bottom edge of the insert so that the insert may be easily formed and removed from the pressing mold. To also assist in removal of the insert, the projection is provided with generally smooth contours, avoiding relatively sharp protrusions or steeply slanting surfaces which may tend to stick in the mold during the ejection of the finished inserts.

Figure 10:
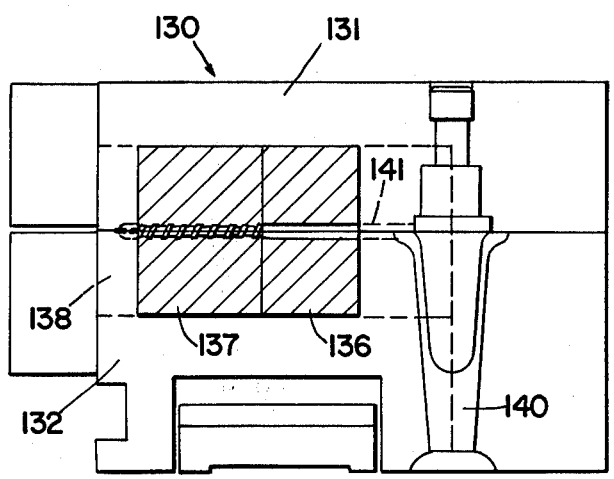
FIG. 10 is a side elevational view of the mold of FIG. 9.

After forming the insert 27, it is placed in a die casting mold for the formation of the drill body. FIGS. 9 and 10 show a die casting mold 130 which may be used to form the drill body using conventional die casting techniques. The mold 130 comprises an upper half 131 and a lower half 132 which are adapted to be mounted on the platens of a conventional vertical die casting machine. A number of cartridges 133–139 may be mounted in the respective mold halves 131 and 132 to form the dies in which the drills are cast. As shown in FIG. 9, the combination of cartridges 133, 134, and 135 may be used to cast a larger sized drill, while the combination of cartridges 136, 137, and 138 may be used to cast a smaller sized drill. Molten metal is supplied to the dies from a gate beneath the lower mold half 132 through a passage 140 in the lower mold half and a system of runners 141. Other cartridges, such as the cartridge 139, provide an extension to the runners 141. The cartridges 133–139 are held in place in the mold halves 131 and 132 by attachment of pins 142.

With the mold halves 131 and 132 open, the inserts 27 are placed in the appropriate cartridges, such as the cartridges 135 and 138, which form a portion of the dies within which the drill is to be cast. The mold halves 131 and 132 are then closed, by closing the platens upon which they are mounted. Molten metal, preferably a zinc die-casting alloy, is introduced into the mold through the passage 140 and the runners 141. As the molten metal enters the mold, it fills the dies and substantially surrounds both of the projections 40 on the inserts. Due to the presence of the channel 28 on the leading end of the drill, a portion of the projection 40 adjacent to the channel may not be covered with molten metal or may be covered with only a thin layer of metal. After filling the die, the drill body is allowed to cool, and the insert is further secured in place by the thermal contraction during the cooling of the die casting alloy. When the drill has cooled sufficiently, the mold halves 131 and 132 are opened, and the finished drill is removed. The insert is thus cast in place on the leading end of the drill. Using the method of the present invention, drills can be produced at high speed and very low cost.

The interlocking relationship between the projection 40 and the cast body 21 of the drill results in part from the interrelationship between the material of the insert and the material of the body during the formation process of the drill. After the insert 27 has been placed in the mold and the molten metal has been poured into the mold to substantially cover both sides of the insert, the drill is then allowed to cool. During the cooling operation, the die casting material of the body of the drill contracts more than the material of the insert. This occurs because the rate of thermal expansion of the die casting alloy is greater than the thermal expansion of the typical carbide material used in the insert. For example, the typical thermal expansion of zinc die casting alloy used in the drill body is about 15.2 microinches per inch per degree Fahrenheit (27.4 microns/meter/°C.), while the thermal expansion of tungsten carbide used in making the insert is only approximately 3.1 microinches per inch per degree Fahrenheit (5.5 microns/meter/°C.). Therefore, as the drill is allowed to cool, the body of the drill will contract significantly with respect to the insert. This contraction will occur on all sides of the insert. Thus, the body will contract around the insert and this contraction will provide pressure on the insert which will serve to securely hold the insert in place in the body of the drill. This effect may sufficiently hold the insert in place in the drill body during operation of the drill, but the mechanical interlock of the projections is also provided as an additional means of assuring that the insert remains in place.

In accordance with one aspect of this invention, the drill body 21 is formed by casting rather than the conventional machining or grinding which has been used in the past to form masonry drills. Preferably, the body 21 is formed in a die casting operation, with the material used in formation of the body being a known die casting alloy. The preferred material for the body is a zinc alloy, although other alloys are possible, such as aluminum die casting alloys. However, aluminum drills would be very lightweight and might be commercially objectionable to many users due to their apparent lack of "heaviness" and the associated impression of less than high quality. Zinc alloys, on the other hand, are similar in density to steel, and therefore are more commercially acceptable to most users, since they appear heavy. In addition, zinc may be die-cast, has adequate strength, has a low melting point, and does not require a surface treatment after casting.

The use of a projection 40 on each side of the insert as an interlocking means is highly preferable to other types of interlocking means, such as holes or cutouts. The use of a hole or cutout could reduce the strength of the insert, and could result in the insert fracturing during use. Also, the formation of such a hole may require an additional manufacturing process during the formation of the insert. Projections can be formed in the insert during the pressing operation of the powdered metal, whereas, a hole or cutout may not easily be formed in this manner and may possibly require subsequent operation after the pressing, such as machining or grinding. Furthermore, the design of some interlocking means such as certain holes or cutouts may result in the material of the drill body contracting away from the surface of the insert during cooling after the drill is cast. This contraction of the drill body material away from the insert would result in gaps which might weaken the drill.

Figure 11:
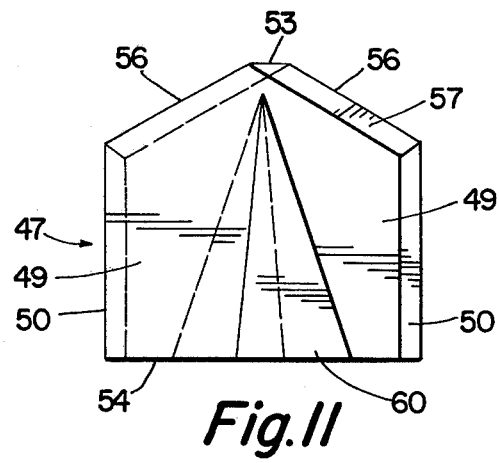
FIG. 11 is a side elevational view of an alternative form of insert for use in the present invention.
Figure 12:
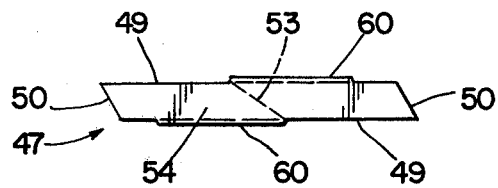
FIG. 12 is a bottom plan view of the insert of FIG. 11.

Other alternative forms of inserts are possible. One such alternative is shown in the insert 47 of FIGS. 11 and 12. The insert 47 is generally similar to the insert 27, with generally flat side portions 49 extending between end faces 50 with a chisel edge 53 extending across the leading end of the insert and a bottom edge face 54 opposite the chisel edge 53. A pair of cutting edges 56 formed by inclined clearance faces 57 extend from each side of the chisel edge 53 between the chisel edge and the end faces 50. The insert 47 differs from the insert 27 in the form of projections 60 which extend from the flat side portions 49 on each side of the insert. The projections 60 are asymmetrical with each projection primarily extending outwardly on the portion of the side adjacent to which the clearance face 57 is inclined. In this manner, the projection 60 does not extend to the channel 28 (FIG. 1) connecting with the groove 25 at the leading portion of the body 21. The insert 47 has the advantage that the projection is more completely covered with metal during the casting operation, since the projection 60 is spaced away from the channel 28. Thus, the projection 60 is more completely covered by the cast material at the drill body 21 and the insert 47 is more securely embedded in the drill and a more secure interlocking relationship is established. However, the insert 47 may not be as easily manufactured in a single pressing operation, due to its asymmetry and due to the relative steepness of the edges of the projection 60 which may make the insert 47 difficult to remove from the pressing mold. Thus, it may not be feasible to form the insert 47 in the pressing mold with the projection 60 in a single operation, and it may require subsequent machining operations, which could result in a higher production cost than the insert 27 shown in FIGS. 4–8.

Figure 13:
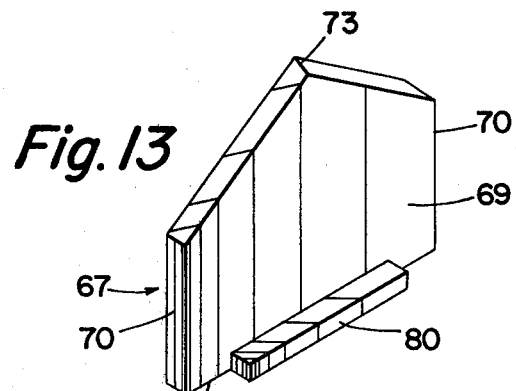
FIG. 13 is a perspective view of another alternative form of insert for use in the present invention.

Another alternative insert design is the insert 67 shown in FIG. 13. The insert 67 has a pair of generally flat side portions 69 extending between end faces 70 and a top chisel edge 73 with a bottom edge face 74 opposite the chisel edge. Projections 80 each extend outwardly from each flat side portion 69 only directly adjacent to the edge of the bottom face 74. The insert 67 of FIG. 13 has the advantage that each projection 80 does not extend upwardly toward the chisel edge 73 for a significant portion of the side of the insert. However, the different thicknesses which define each projection 80, in comparison to the distance between the chisel edge 73 and the bottom face 74, make the insert 67 more difficult to be formed in a single pressing operation, due to the problems of the flow of the powdered metal and differential pressure needed to form the projections. Therefore, it may not be feasible to form the insert 67 in a single operation, and subsequent machining or grinding operations subsequent to the pressing of the insert in a mold may be required. Hence, the insert 67 may be more expensive to manufacture than the insert 27.

Figure 14:
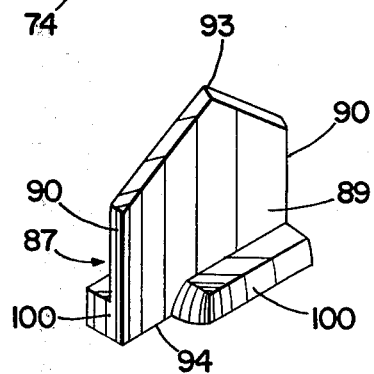
FIG. 14 is perspective view of still another alternative form of insert.

Another alternative insert design is shown in FIG. 14. This insert 87 is generally similar to the insert 67 shown in FIG. 13 with flat side portions 89, end faces 90, a chisel edge 93, and a bottom edge face 94, but the insert 87 has a pair of projections 100, each of which may be thicker than the projection 80 and each of which extends to one of the end faces 90 but terminates short of the other end face so that the projection does not extend to the channel 28 and may be completely covered with the material of the drill body to provide a more secure interlocking relationship. As with the insert 47 of FIG. 11, the insert 87 of FIG. 14 has the advantage of projections spaced away from the channels 28 so that the projections may be completely covered with molten metal during the casting of the drill body, and as with the insert 67 of FIG. 13, the insert 87 has projections which do not extend upwardly toward the chisel edge for a significant portion of each side of the insert. However, the insert 87 of FIG. 14 may not be formed by a single pressing operation and may require subsequent machining or grinding, as with the inserts 47 and 67 of FIGS. 11 and 13.

Figure 15:
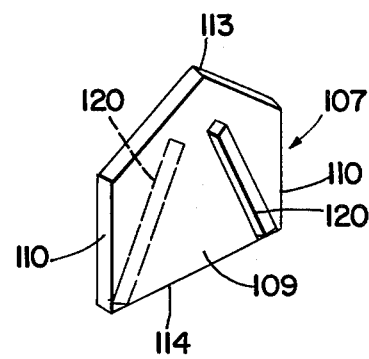
FIG. 15 is a perspective view of yet another alternative form of insert.

Another alternative insert design is shown in FIG. 15, in which an insert 107 has flat side portions 109, end faces 110, a chisel edge 113, and a bottom edge face 114. The insert 107 has a pair of projections 120 each of which extends from the bottom edge face 114 toward the chisel edge 113, with each projection slanting inwardly toward the center of the flat side portion 109 as it extends upwardly. The projections 120 do not extend to the channel 28 and extend a substantial distance along the sides of the insert 107 to enhance the interlocking capabilities. However, the insert 107 may be difficult to produce economically, due to the shape of the projection 120.

Other modifications and variations are possible. For example, a steel core or other reinforcing core may be inserted in the drill body 21. Such a core would be placed in the die casting mold prior to the introduction of the molten metal used to form the drill body and would serve to reinforce the body of the drill and prevent breakage of the drill under especially extreme conditions. The insert may also be brazed on the leading end of the reinforcing core to further secure the insert in the drill body.

While the invention has been shown and described with respect to specific embodiments thereof, it will be apparent to those skilled in the art that other variations and modifications of the specific form herein shown and described may be used without departing from the spirit and scope of the invention. Accordingly, the patent is not to be limited in scope and effect to the specific embodiments herein shown and described, nor in any other way which is inconsistent with the extent to which the progress in the art has been advanced by this invention.

What is claimed is:

1. A drill adapted for use in drilling masonry or other hard, brittle material, which comprises:
   an axially elongated, generally cylindrical body having a leading front end portion and a rear end portion, said rear end portion adapted to be held by a tool holder, said body being formed of a die cast material and having at least one spiral groove cast in its exterior surface substantially along its length; and
   a hard insert embedded in the leading end of said body, said insert being generally flat and extending generally diametrically across said leading end of said body, the sides of said insert having parallel planar side portions and a chisel edge across the top of said insert with leading cutting edges on either side of said chisel edge and a bottom edge on said insert opposite said cutting edges, said insert having means for interlocking with said body, said interlocking means comprising a pair of projections each extending from the plane of one of said flat side portions, each of said projections extending the greatest distance from the plane of said side portion near said bottom edge of said insert, said projections being in a contiguous relationship with said body and substantially surrounded by said body to retain said insert within said body without the addition of other securing material, the portion of each of said projections nearest said chisel edge being entirely covered with said die cast material of said body to form a secure interlocking relationship between said insert and said body.

2. A drill as recited in claim 1, wherein each of said projections is generally symmetrical about an axis extending normally from said bottiom edge to said chisel edge of said insert.

3. A drill as recited in claim 1, wherein each of said projections tapers inwardly toward the plane of said flat side portions of said insert as said projection extends from said bottom edge toward said cutting edges.

4. A drill as recited in claim 1, wherein each of said projections extends the greatest distance from the plane of said flat side portions at said bottom edge near the center of said insert, and each of said projections tapers inwardly toward the plane of said flat side portion as said projection extends outwardly toward the ends of said insert.

5. A drill as recited in claim 1, wherein said projection is formed with generally smooth contours.

6. A drill as recited in claim 1, wherein the coefficient of thermal expansion of said die cast material of said body is greater than that of said insert.

7. A drill as recited in claim 1, wherein said die cast material of said body is a zinc alloy.

8. A drill as recited in claim 1, wherein said hard insert is formed of tungsten carbide.

* * * * *